Oct. 10, 1950 G. DEAKIN 2,524,773

CALLING PARTY IDENTIFICATION FOR AUTOMATIC TELEPHONE SYSTEMS

Filed April 4, 1944 7 Sheets-Sheet 1

INVENTOR.
Gerald Deakin
BY
[signature]
AGENT

Oct. 10, 1950 G. DEAKIN 2,524,773

CALLING PARTY IDENTIFICATION FOR AUTOMATIC TELEPHONE SYSTEMS

Filed April 4, 1944 7 Sheets-Sheet 2

INVENTOR.
Gerald Deakin
BY
[signature]
AGENT

INVENTOR.
Gerald Deakin
BY
[signature]
AGENT

INVENTOR.
Gerald Deakin
BY
AGENT

INVENTOR.
Gerald Deakin
BY
[signature]
AGENT

INVENTOR.
Gerald Deakin
BY
AGENT

INVENTOR.
Gerald Deakin
BY
AGENT

Patented Oct. 10, 1950 2,524,773

UNITED STATES PATENT OFFICE 2,524,773

CALLING PARTY IDENTIFICATION FOR AUTOMATIC TELEPHONE SYSTEMS

Gerald Deakin, New York, N. Y., assignor to International Standard Electric Corporation, New York, N. Y., a corporation of Delaware Application April 4, 1944, Serial No. 529,506

20 Claims. (Cl. 178—8.5)

This invention relates to automatic and semi-automatic telephone exchange systems and more particularly to party line measured service and identification.

An object of my invention is the provision of means for the automatic identification of a calling party line station by a register when the calling party dials the first digit of a wanted subscriber's number.

A further object is the provision of automatic means whereby when a party line station initiates a call a distinctive class of service signal is transmitted to the register which is automatically converted from its normal condition for dealing with main line calls to a modified condition for handling party line calls.

In a preferred arrangement the register, after being taken into use by a party line call, sends back to the calling circuit over the test wire a signal, for example a distinctive potential, characteristic of the identity of the calling party line. A party line identification circuit, which serves a group of party lines, associates itself with the calling party line and in response to the distinctive potential connects the individual service meter and first identification line finder terminals of the calling party line station to the calling party line circuit. The before-mentioned identification potential is also automatically connected over the test wire to the test terminal of the calling party line station in the bank of the first identification finder switch, whereby when a toll operator or automatic ticketer or the like searches for the number of the calling station the number obtained will always be that of the calling station.

These and other objects and features of my invention will be clear from a reading of the following detailed description taken in conjunction with the accompanying drawings which illustrate a preferred embodiment of my invention.

Figure 2:
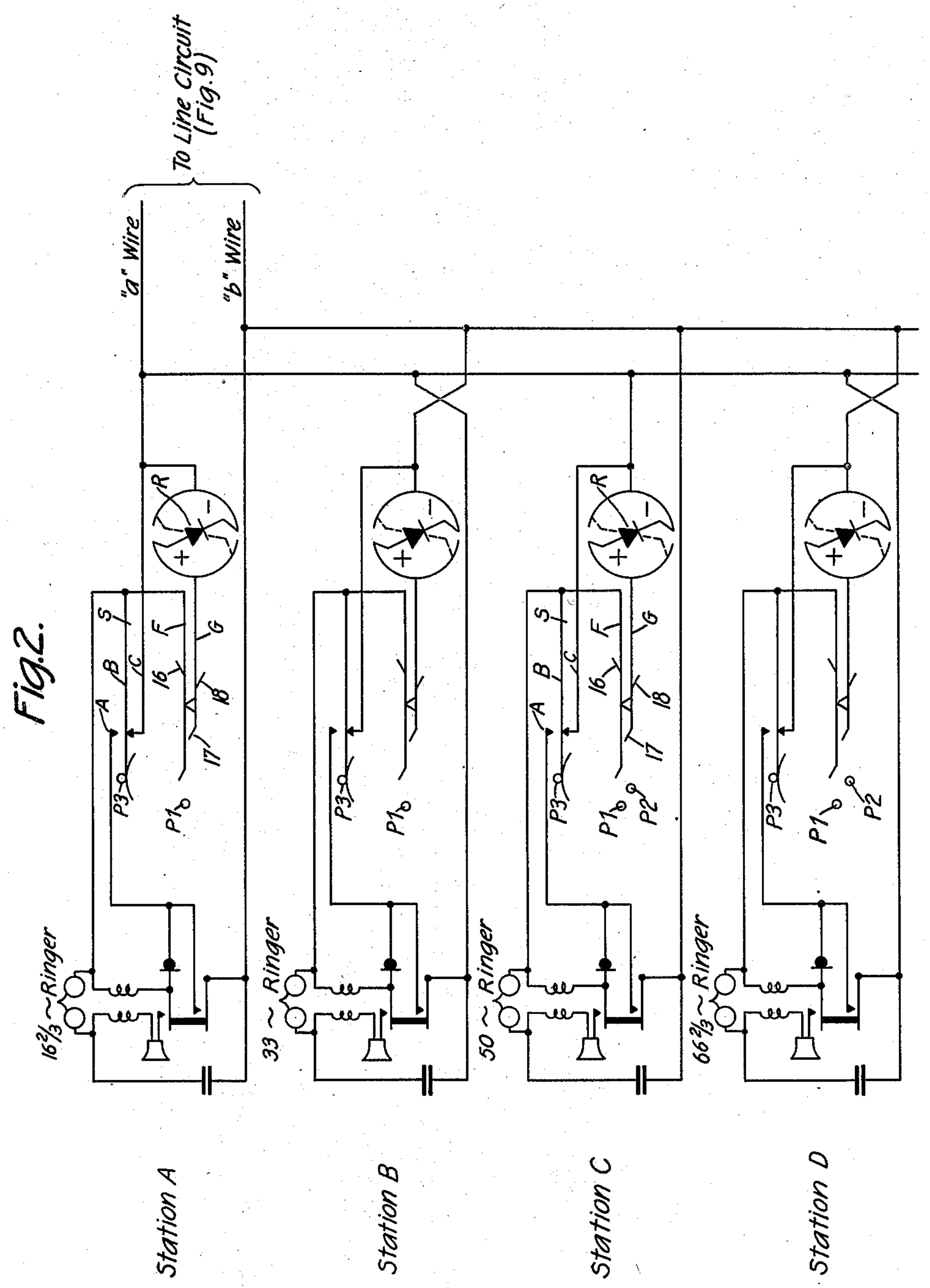
Fig. 2 is a circuit diagram of a four party line station circuit provided with rectifier dialing.

Referring first to Fig. 2, the station circuits A, B, C and D shown therein are apart from the rectifier dials R of the usual type. The rectifier dials which will be described later in connection with Figs. 3 to 7 each include a rotating rectifier R and a home contact spring nest S. The operation of the rectifier dial from a circuit point of view is as follows: When the finger wheel is moved off normal a pin P3 allows spring B to break contact with spring C which removes a short circuit from the rectifier R and to make contact with spring A which short circuits the induction coil and transmitter. Pin P1 causes spring F to break contact with spring G until shortly before the first finger hole reaches the finger stop; in other words, the line circuit is momentarily opened each time the finger wheel is turned to the finger stop. When the finger wheel is released, the rectifier R makes one-half of a revolution for each finger hole passing the finger stop but before the last finger hole passes the finger stop the pin P1 again opens contact between the springs F and G thereby momentarily opening the line circuit which causes the digit change-over in the register to take place. As will be clear from the subsequent description of the rectifier dial, the rectifier is always returned to its predetermined position of polarity. Thus, should an odd digit be dialed the rectifier is given a half revolution to restore it to its normal position while contact between springs F and G is open.

From what has been said above it will be seen that when the digit 1 is dialed the initial closure of the line through the rectifier R in its normal position sends the first pulse to record the digit 1 and that when the finger wheel is released the circuit is opened for the change-over before the rectifier reverses the current. The polarity of the first pulse is determined by the manner in which the station is connected to the line.

Contact P2 is used only at stations C and D and its purpose is to cause the transmission of a second positive or negative pulse when the dial is pulled to the finger stop.

When the finger wheel is moved off-normal with pin P2 in position, pin P1 first opens contact between springs F and G, but shortly afterwards this contact is momentarily closed by pin P2 engaging the lip 17 of spring G. Springs F and G are again permitted to make contact when the wheel has been moved just less than two finger hole spaces and the pin P2 rides over lip 18. By this means two pulses of the same polarity are sent to the register as will be described later. The register records the first digit on the first pulse but as polarity is not changed, the second pulse merely indicates to the register the identity of the station and does not add a digit to the number dialed. The stations A and B are identical to normal stations except that station B is reversed with respect to station A as regards its connection to the *a* and *b* wires extending to the line circuit. Stations C and D are connected in the same manner as stations A and B, respectively, but in addition their rectifier dials are equipped with the pin P2.

Figures 3, 4, 6:
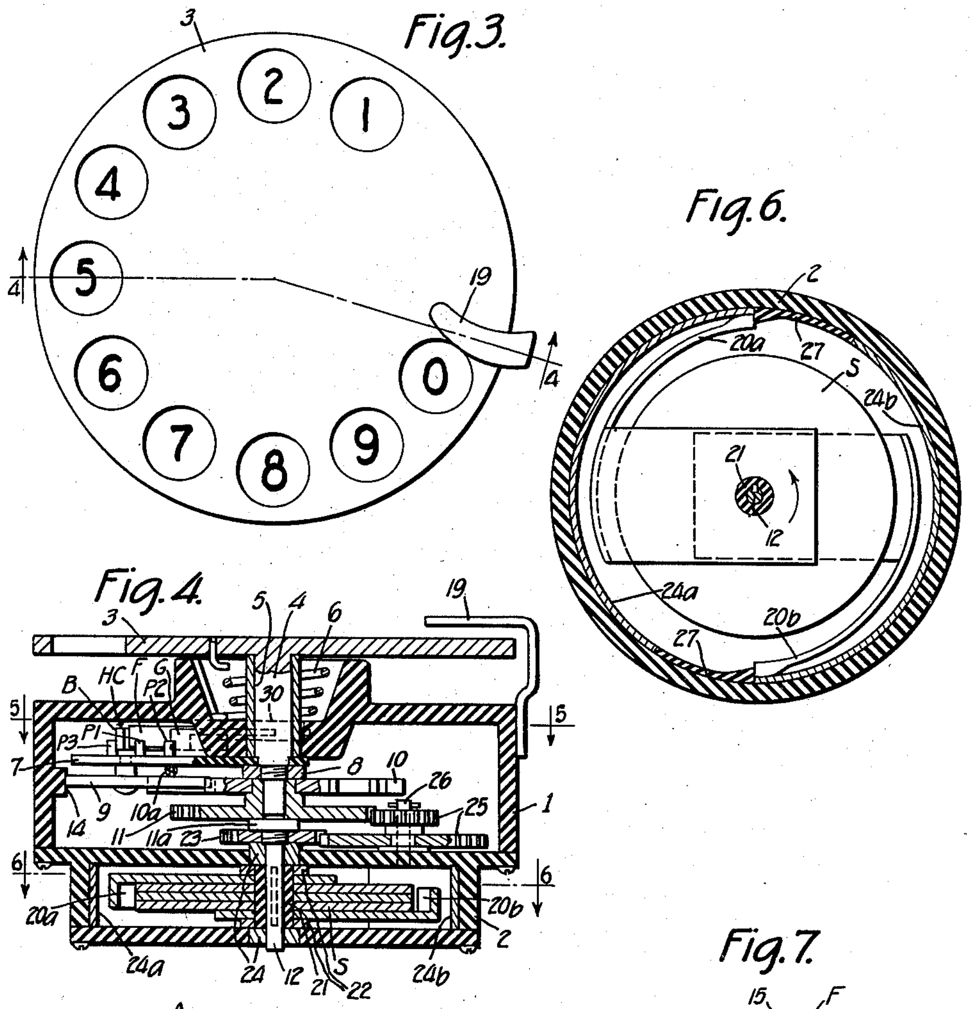
Fig. 3 is a plan view of a rectifier dial showing the finger hole plate and finger stop.
Fig. 4 is an elevation partly in section taken on the line 4—4 of Fig. 3.
Fig. 6 is a section taken on the line 6—6 of Fig. 4.
Figure 5:
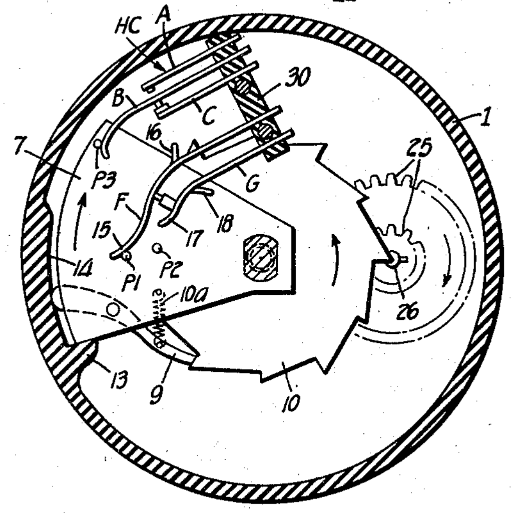
Fig. 5 is a section taken on the line 5—5 of Fig. 4.

The construction of a suitable rectifier dial is illustrated in Figs. 3 to 7 and will now be described. Referring first particularly to Figs. 4 and 5, the dial consists of two main parts, an upper part 1 housing the home contact nest HC and a lower part 2 housing the rotating rectifier S.

In the upper housing 1 is mounted a finger wheel 3 provided with the usual finger holes and attached to a shaft 4 which rotates in a sleeve 5 in the housing 1 when driven by a coiled spring 6, one end of which is attached to the finger wheel 3, while the other rests in a groove in the housing part 1. A segment 7 is attached to shaft 4 by nut 8. A pawl 9 is pivoted to the segment 7 and tends to engage the teeth of a ratchet wheel 10 under the tension of a spring 10*a*.

Ratchet wheel 10 and a gear wheel 11 are attached to each other and rotate freely on the lower extension of shaft 4. They are held in position by the flat head 11*a* of a bearing pin 12 when the lower part 2 housing the rectifier unit is mounted in position. Ratchet wheel 10 has a number of teeth corresponding to the number of positions of the finger wheel 3. Every other tooth is relatively long (in a radial sense). When the finger wheel 3 is in its normal position one edge of the segment 7 rests against a back stop 13 formed in the housing 1 and a raised surface 14 on the inner periphery of the housing 1 adjacent the stop 13 lifts the pawl 9 so that it engages only the deep teeth of ratchet 10.

When the finger wheel 3 is rotated by the user, the segment 7 moves clockwise and when it has moved an angular distance equal to about one finger hole spacing the raised surface 14 no longer bears on the pawl 9 and the latter rotates slightly about its pivot so as to engage both the long and the short teeth of the ratchet wheel 10. Should the finger wheel be turned a distance equal to five finger holes, that is, should the digit 3 be dialed, since there is a space equal to two finger holes between the hole number 1 and the finger stop 19, the pawl 9 will engage a short tooth. When the finger wheel is released the spring 6 will rotate the ratchet wheel 10 counter-clockwise. As the segment 7 approaches its home position, the pawl 9 engages the raised surface 14 and thus disengages the short tooth but re-engages the next long tooth just before the segment 7 comes to rest against the back stop 13. The object of this arrangement is to insure that the rectifier S always returns to its predetermined position of polarity.

The home spring nest consists of five springs A, B, C, F and G, Figs. 2 and 5, mounted in a block 30 of insulating material fixed to the housing 1. Two pins P1 and P3 are mounted on the segment 7 in such position that when the finger wheel is moved off normal, pin P1 opens the contact between springs F and G, whilst pin P3 opens the contact between springs B and C and permits contact to be made between springs A and B. A third pin P2, which is readily detachable, is used at stations C and D and is mounted on segment 7 in such position that it engages spring G shortly after pin P1 opens springs F and G. The segment 7 is of insulating material.

Figure 7:
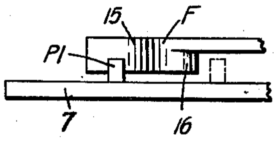
Fig. 7 shows a detail of the spring nest in the rectifier dial.

Assume now that the digit 1 is dialed at any station. When the finger is placed in hole number 1, Fig. 3, and the finger wheel is moved off normal, pin P1 engages the tip 15 of the extension of spring F, Figs. 4 and 7, and breaks the normal contact between springs F and G. Spring F is cut away at its lower edge and provided with an inclined lip 16, as shown in Fig. 7. When the hole number 1 has been moved an angular distance less than two finger hole spaces, pin P1 rides over the lip 16 and disengages the spring F, so that when the finger reaches the finger stop 19 contact between springs F and G is again made. The three home contact springs A, B and C are shown in their normal positions in Fig. 5. When segment 7 is moved off normal, pin P3 disengages spring B thereby causing contact to be broken with spring C and made with spring A. The springs A, B and C remain in this position until the dial returns to normal.

When the finger wheel 3 is released, after it has moved about three-quarters of a finger hole space, pin P1 reengages the projecting lip 16 of spring F and again opens the contact between springs F and G. When segment 7 reaches its normal position against the back stop 13, contact between springs F and G is restored.

As already stated when the dial is used at stations C and D pin P2 is added. This pin P2 engages the lower lip 17 of spring G (shortly after pin P1 opens the contact between springs F and G) and causes spring G to remake contact with spring F for a short period. Spring G is cut away at its lower edge and formed with an inclined lip 18 similar to the spring F. When the pin P2 rides over this lip 18 shortly afterwards, contact between springs F and G is broken again before pin P1 allows springs F and G to make contact just before the second position is reached. Thus when the pin P2 is used, two positive or two negative impulses are sent during the initial movement of the finger wheel and depending upon the connections to the *a* and *b* wires.

The lower part 2 houses the rectifier discs S, Figs. 4 and 6. These are assembled on a bushing 21 of insulating material. Brush 20*a* is clamped against the rectifier disc on one side of the rectifier unit and brush 20*b* is clamped against the disc on the other side by means of nuts 22. A bearing pin 12 which passes through the bushing 21 has screwed to it a gear wheel 23 and rotates in bushings 24 attached to the upper and lower covers of the rectifier housing 2. The bearing pin 12 is grooved so that when it is slipped through the bore of the bushing 21 the rectifier assembly S and brushes 20*a* and 20*b* rotate with the bearing pin 12 and the gear wheel 23.

The upper and lower brushes 20*a* and 20*b* rub against collector rings 24*a* and 24*b* mounted on the inside wall of the housing 2 as shown in Fig. 6. The external connections are connected to the collector rings 24*a* and 24*b*. Gear wheels 11 and 23 are interconnected by pinions 25 which are attached to each other and held in position by a bearing pin 26 mounted in the upper end of the housing portion 2. The ratchet and gear wheels are assembled so that when the wheel 10 is in the position shown in Fig. 5 the rotating rectifier unit S is in the position shown in Fig. 6. The ratio of the various gears is such that the rectifier unit S makes one complete revolution when the finger wheel 3 moves an angular distance equal to two finger hole spaces.

The setting of brushes 20a and 20b, Fig. 6, is such that when they engage the insulating surfaces 27 between the collector rings 24a and 24b as position of the ratchet wheel passes the normal position 1 on the return journey, the pin P1 engages lip 16 of the spring F and opens the contact between springs F and G. Thus the contact between these springs is opened before the brushes 20a and 20b make contact with the succeeding collector rings.

As speed control of a rectifier dial is not critical it is sufficient to weight the brushes 20a and 20b at their ends so that they act both as governor wings as well as collector brushes.

The method of party line dialing according to my invention will first be described in a general way as applied to a multi-potential telephone exchange system of the kind fully disclosed in my copending application Serial No. 521,160, filed February 5, 1944.

Figure 9:
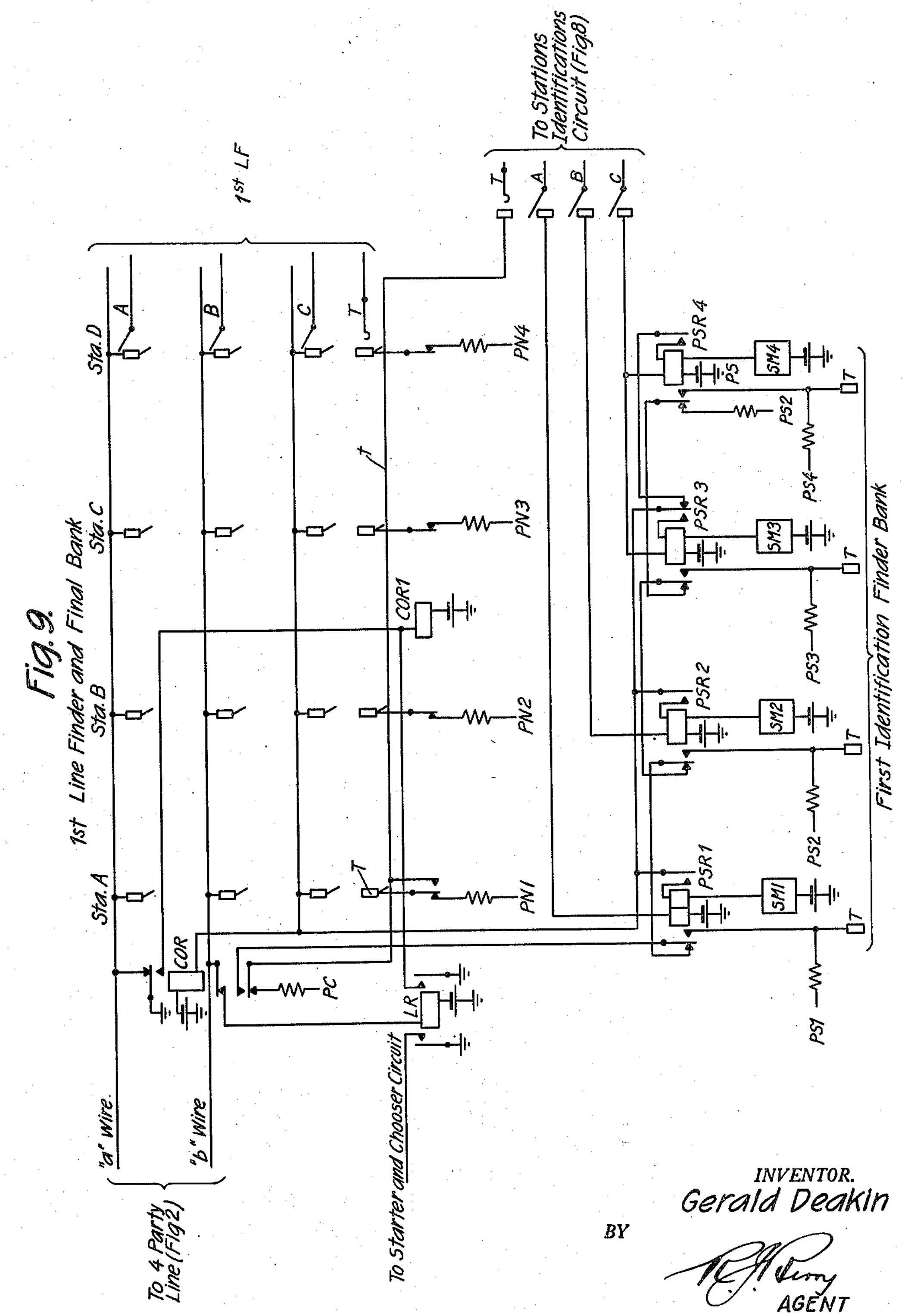
Fig. 9 is a circuit diagram of a four-party station subscriber's line circuit with individual meters.

Each station of a four-party line is provided with a set of terminals in the banks of the first line finders and finals and in the banks of first identification finders (see Fig. 9). Each station has its individual negative PN potential connected to its test terminal T over the back contact of a cut-off relay COR1. Each station is provided with an individual service meter SM and when a station dials, its service meter and only its service meter is connected to the c wire by a relay PSR which is individual to each station and which relay also connects the T termial of the first identification finder and only that T terminal to the test wire of the line circuit. Thus when service meter current is placed on the c wire the service meter SM of the calling station and only the calling station is energized and when the numerical positive identification potential PI is placed on the test wire, the number of the calling station and only the calling station is passed back to the identifying operator in the manner fully described in my copending applications Serial Nos. 484,184 and 491,628, filed April 23, 1943, now Patent No. 2,380,950, and June 21, 1943, now Patent No. 2,376,346, respectively. Finally, the negative service class potential PS connected to the T terminal of the first identification finder indicates to the operator which of the four stations is calling, as described for example, in my copending application Serial No. 521,160, filed February 5, 1944. By this means the wire chief can check the character of the dialing against the station identification potential and in this way catch false manipulation on the part of a subscriber who may know sufficient of the operation of the system to reverse the wires at his station and thereby cause a call to be charged to another station.

The operation of the circuits will now be described in detail.

Figure 1:
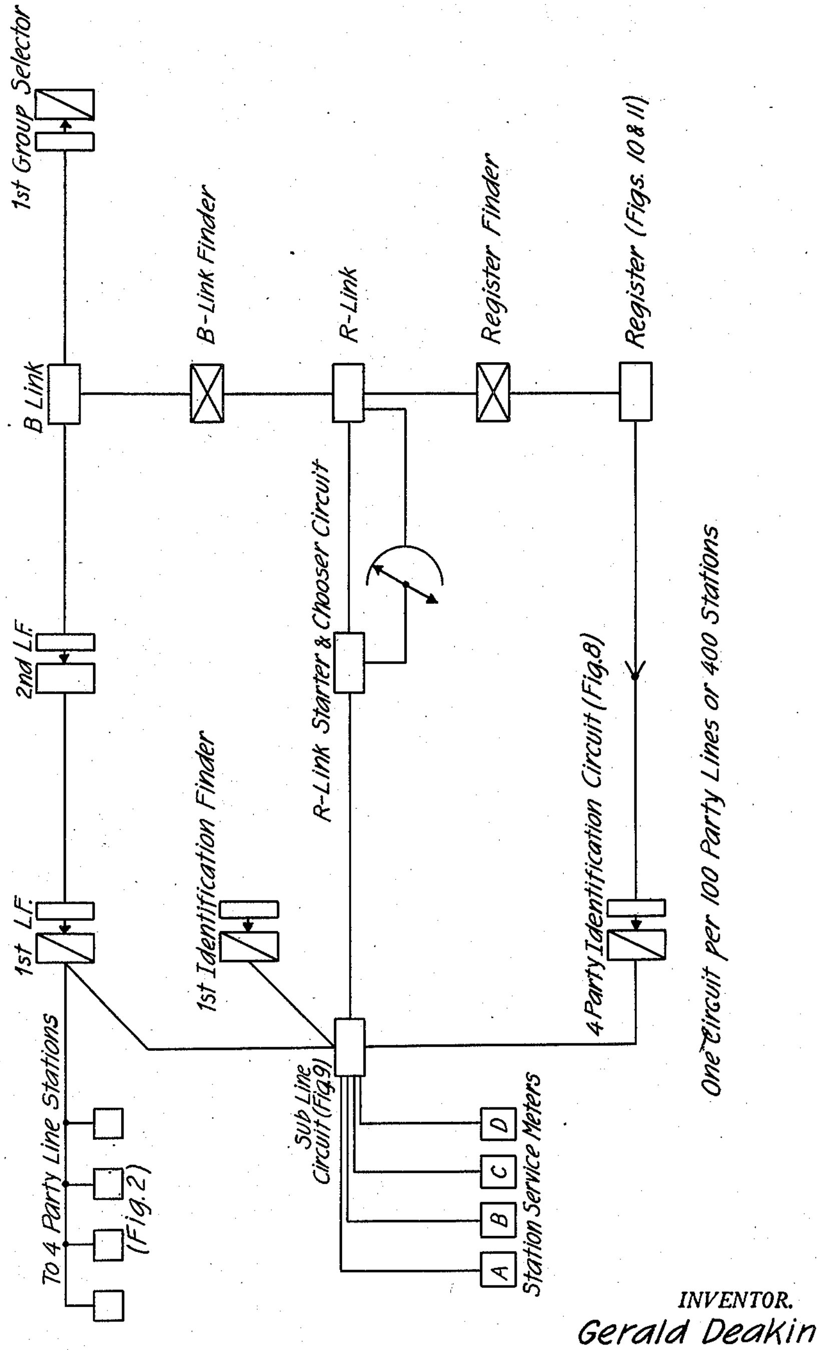
Fig. 1 is a block schematic drawing showing sufficient of the layout of an exchange to give a clear understanding of the present invention.

When any calling subscriber removes his receiver, relay LR, Fig. 9, in the line circuit operates over the station loop, closes an obvious circuit for cut-off relay COR1 and grounds the associated R-link starter and chooser circuit which selects an idle R-link (Fig. 1), a register finder associated with which connects up an idle register and a B-link finder associated with which selects an idle B-link having associated therewith a first group selector and a second line finder. The second line finder hunts for an idle first line finder having access to the calling line. Relay COR1, Fig. 9, disconnects the negative individual PN potentials from the four test terminals and in place thereof connects the test terminal T of station A to the negative calling line potential PC which is applied over the lower back contacts of cut-off relay COR. Thus it will be seen that when a call originates from any station the terminals of station A are always picked up by an idle first line finder which extends the call over a B-link and an R-link to a register as fully described in my copending application Serial No. 521,160, filed February 5, 1944.

When the first line finder picks up the calling line, the cut-off relay COR operates in the usual manner over the c wire, disconnects the line relay LR from the calling line and the calling line potential PC from the test terminal T and the t wire, and in place thereof connects to the t wire over back contacts of relays PSR1, PSR2, PSR3 and PSR4, a negative service class potential PS2 which potential is extended at this stage to the register and not to a trunk to an operator. This particular potential is used for two purposes; first to indicate to the register a call coming from a four-party line, and subsequently to indicate to an operator that station B is calling.

Figure 10:
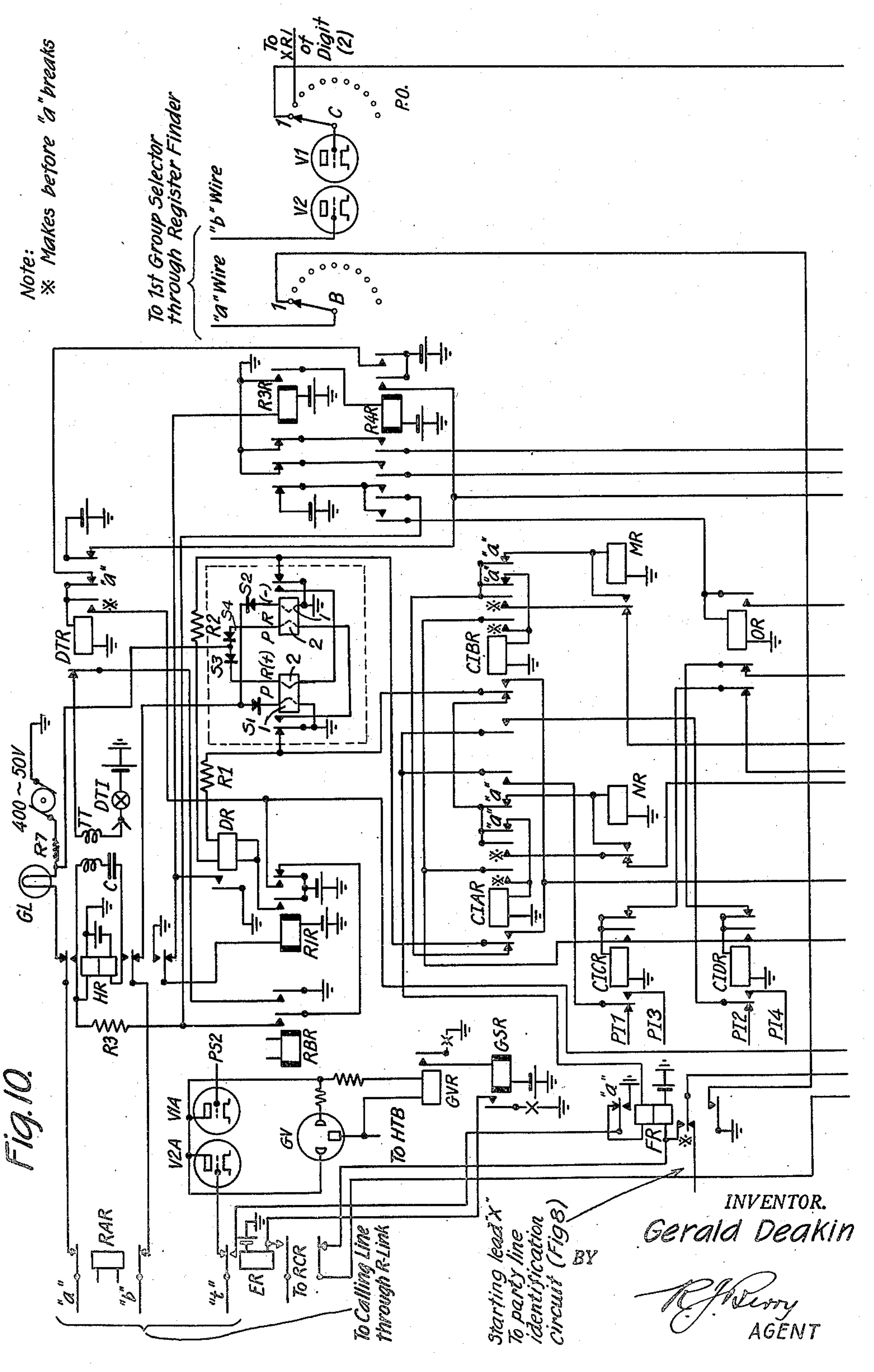
Figs. 10 and 11 (Fig. 11 placed below Fig. 10) show a circuit diagram of a register adapted for four-party line rectifier dialing.
Figure 11:
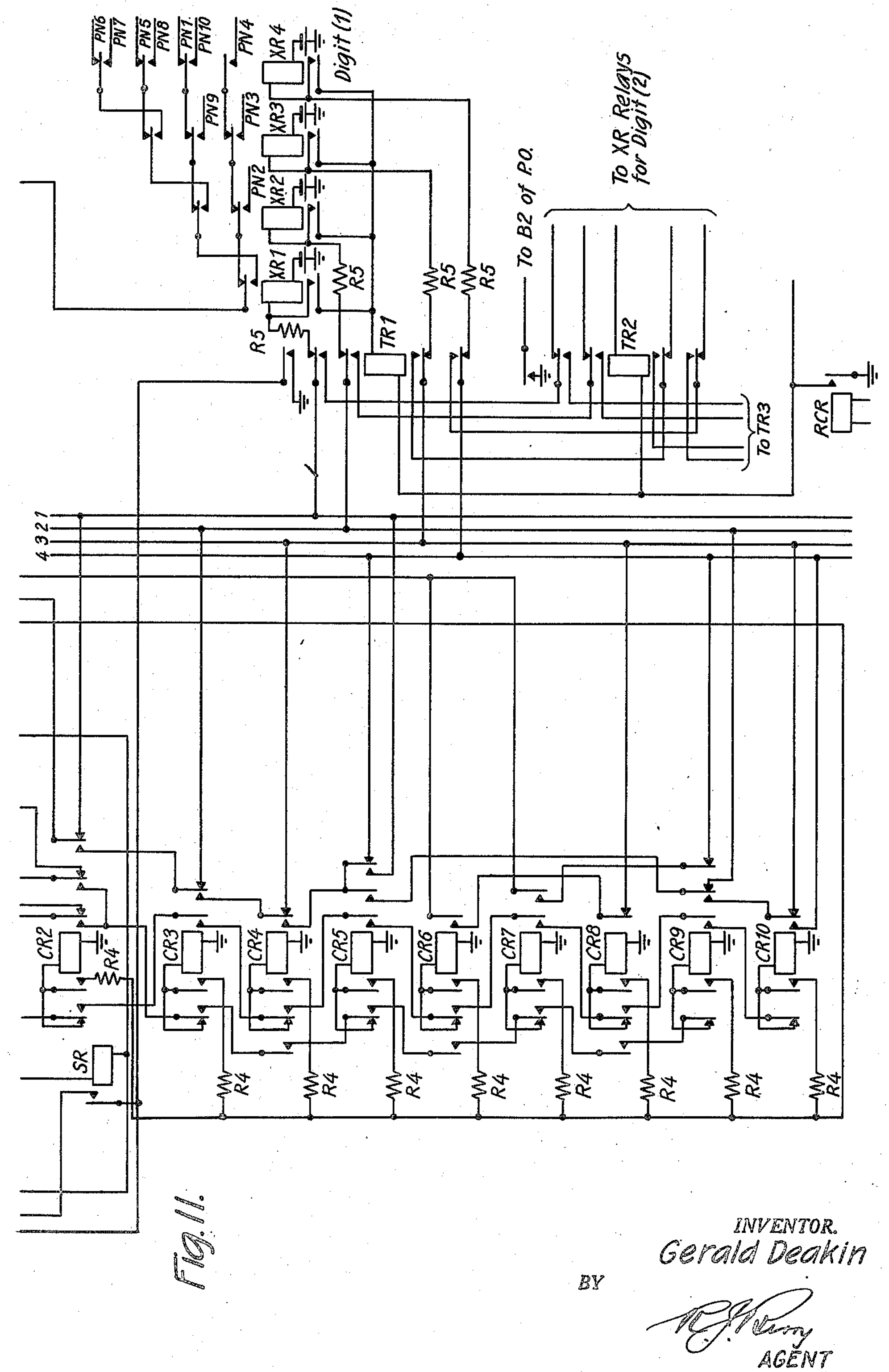

The register shown in Figs. 10 and 11 is generally similar to the register described in my copending application last referred to and only that part of the circuit has been shown which relates to party line rectifier dialing since it is believed that this will enable a clear understanding of the present invention without the introduction of unnecessary complication. When the calling line is picked up, relays RAR and RBR release and operate, respectively, as described in the copending application last referred to and relay HR operates over a circuit extending from battery, back contacts of relay R1R, front contacts of relay RBR and upper winding of relay HR. Relay HR locks up over both its windings and the calling line. At the same instant the potential PS2 derived over back contacts of relays PSR4, PSR3, PSR2, PSR1, front contacts of relay COR, and front contacts of relay COR1 is extended over a first line finder, second line finder, B-link, R-link, brush of the register finder and upper back contacts of relay ER, Fig. 10, to the grid of tube V2A. The pair of tubes V1A, V2A and the gas valve GV, are arranged and operate in the manner fully described in copending application Serial Nos. 485,827, now Patent No. 2,354,682, and 521,160, now Patent No. 2,484,080, filed May 6, 1943, and February 5, 1944, respectively. Since the grid of tube V1A is connected to potential PS2 which is the potential which indicates a four-party line, gas valve GV fires and operates relay GVR which in turn operates relay GSR. Relay GSR closes an obvious circuit for relay ER which locks up and disconnects the t wire from the grid of tube V2A and in place thereof connects it to the low resistance upper winding of relay FR over a back contact of relay FR. Should the register not find potential PS2 on the t wire, gas valve GV will not fire, relay ER is not operated, the register makes no attempt to identify the calling line and the connection is set up in a normal manner. The t wire may, of course, be connected to the grids of other tube circuits set for other class identifications to which the register may adapt itself.

Upon energization, relay HR closes a circuit for a slow release relay R1R which places battery on both windings of a differential relay DR, the windings of which are so arranged that the relay does not operate as long as both windings are energized over back contacts of impulsing relays PR(+) and PR(−). Upon energization of relay RBR a circuit is also closed over the dialing tone interrupter DTI and the dialing tone transformer TT, and when the relay HR operates the dialing tone is sent over the subscriber's line. The circuit remains in this condition until the subscriber commences to dial.

As already explained, the four stations of a party line are identified by the character of the pulse or pulses sent when the dial is pulled to the finger stop. The identifying pulses are as follows:

Station A, one positive pulse
Station B, one negative pulse
Station C, two positive pulses
Station D, two negative pulses By a positive pulse is meant current flowing from the *b* wire to the *a* wire and by a negative pulse is meant current flowing from the *a* wire to the *b* wire.

The register circuit is provided with four first counting relays CIAR, CIBR, CICR and CIDR. The first relay CIAR is energized when station A dials, the second one CIBR is energized when the station B dials, the first and third CIAR and CICR are energized when station C dials and the second and fourth CIBR and CIDR are energized when station D dials.

When station A dials, as the finger wheel of the rectifier dial is moved from its home position the pin P3 opens contacts B and C (Fig. 2) and removes the short circuit from the dial rectifier R and the line circuit is momentarily opened. Relay HR releases but not the slow release relay R1R. When the line circuit is closed again to send one positive pulse over the line, the line circuit is again closed, this time through the rectifier R in the subscriber's set and current flows in such a direction as to energize polarized relay PR(+), Fig. 10. This current flows from the 400 cycle, 50 volt source over a resistor R7, a guard lamp GL, back contacts of relays HR and RAR, *a* wire, dial rectifier R at the sub-station, *b* wire, back contacts of relays RAR and HR, rectifier S1 and the left-hand winding 1 of relay PR(+). Relay PR(+) operates and opens its back contacts thus opening one winding of differential relay DR and causing it to operate. Relay PR(+) also removes a short circuit from relay CIAR and relay NR both of which operate. Relay DR energizes relay R3R which closes a circuit for relay R4R. Relay DR completes a holding circuit for relay R1R over a back contact of relay HR. When relay R4R pulls up it closes a circuit for relay DTR which locks up and removes dialing tone from the subscriber's line.

Relay CIAR locks up in series with a relay SR to a front contact of relay R1R and relay NR locks up over front contacts of relay CIAR.

If station B dials the same sequence of operations takes place with the exception that responsive to the transmission of a negative pulse over the line the negatively polarized relay PR(−) breaks its back contact and short circuits are removed from the relays CIBR and MR. Relay CIBR locks up in series with relay SR as before, and relay MR locks up over a front contact of relay CIBR.

When station C dials and two positive pulses are sent, responsive to the first positive pulse, relays CIAR and NR operate and lock up as before. Between positive pulses, however, the line circuit is opened, polarized relay PR(+) closes its back contacts and shunts out the relay NR which thereupon releases. Thus when relay PR(+) breaks its back contacts for the second time, a circuit is established over one winding of relay DR, a back contact of relay CIBR, front contacts of relay CIAR, back contacts of relay NR, back contacts of second counting relay CR2, back contacts of relay OR and relay CICR for relay CICR which locks up in series with relays SR. Similarly, when station D dials the two negative pulses result in the operation and locking up of relays CIBR and CIDR responsive to successive operations of the negatively polarized relay PR(−).

When the finger wheel is released, alternative positive and negative pulses energize the polarized relays PR(+) and PR(−) and successively energize the counting relays CR2 to CR10 which lock up over resistors R4.

It will be noted that when the dial rectifier at the calling party line station is in a position to allow a positive pulse to pass, the ringers at the other party line stations on the line are effectively short-circuited by the rectifier as regards this positive pulse, but during the time that the rectifier is passing this positive pulse, which actually consists of an integrated group of short positive half cycles, the simultaneous complementary group of negative half cycles is not short-circuited by the rectifier and unless provision is made will pass through the ringers and condensers at the other stations. When the rectifier at the calling station reverses and passes a negative pulse, the ringers receive the integrated groups of positive half cycles, and so on. Since these pulses arrive at a speed of 20 to 40 cycles, the ringers will chatter when the current is of sufficient strength. This is prevented by effectively short-circuiting all pulses so far as the ringers are concerned.

Relay PR(+), Fig. 10, is so polarized as to break its back contacts only when it receives positive pulses and relay PR(−) is polarized so as to break its back contact only when it receives negative pulses. Each of these relays has a high resistance winding 1 and a low resistance winding 2 and a rectifier is inserted in series with each winding. Assuming that the rectifier at the calling station is in position to pass a positive pulse, this pulse will pass through rectifier S1 and winding 1 of relay PR(+), but rectifier S2 is so polarized as to prevent the positive pulse of current from passing through winding 1 of relay PR(−). When the armature of relay PR(+) makes its front contact it connects the lower end of low resistance winding 2 of relay PR(−) to ground. The other end of this winding is connected through rectifier S4 to the line and the source of alternating current through resistance R7. Rectifier S4 is polarized to pass only negative pulses. Thus the integrated positive half cycles from the generator pass through the dial rectifier at the calling station and through rectifier S1 to energize relay PR(+), while the negative half cycles pass through the rectifier S4 and winding 2 of relay PR(−). As relay PR(+) is quick acting, it closes the negative pulse shunt through relay PR(—) before the bridged ringers can receive sufficient current for them to chatter. The negative pulse also tends to force the armature of relay PR(—) against its back contact, whereby a push-pull action of the relays PR(+) and PR(—) is obtained. When the dial rectifier at the calling station reverses its polarity, the negative pulse operates relay PR(—) over rectifier S2 and relay PR(—) closes a shunt for the contemporaneous positive pulse over rectifier S3 and winding 2 of relay PR(+).

Figures 8, 12:
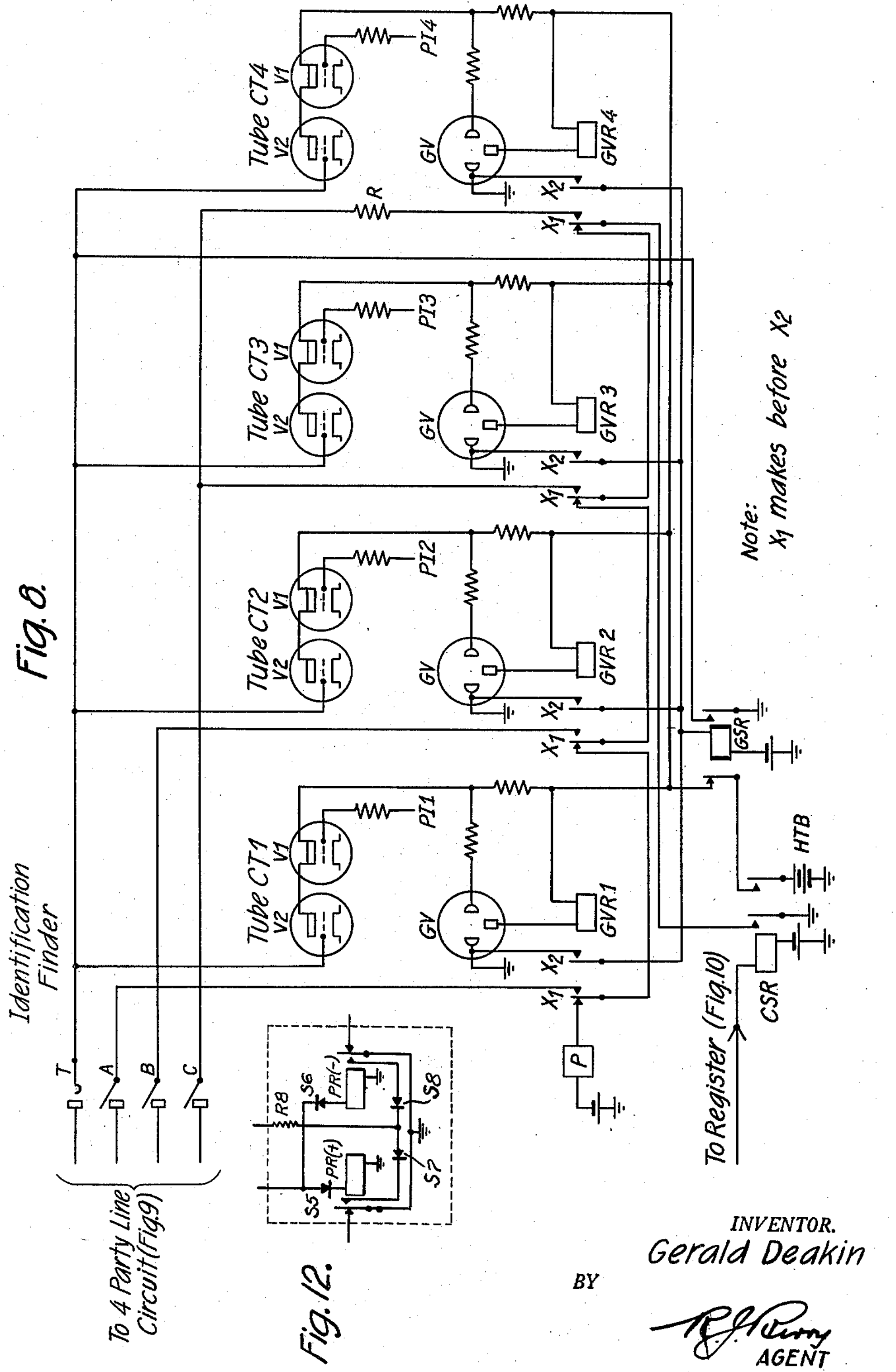
Fig. 8 is a circuit diagram of a four-party station identification circuit.
Fig. 12 shows a circuit diagram of a modified arrangement for the pulsing relays in the register.

Fig. 12 shows a modified arrangement of the stepping relays PR(+), PR(—) in which the push-pull action of these relays, which is not necessary for slow or moderate speed dialing, is not employed. In this arrangement the relays are only provided with a single winding. When a positive pulse passes through the dial rectifier at the substation, relay PR(+) operates through rectifier S5 and connects rectifier S7 to the generator through resistances R8 and R7 so as to absorb the simultaneous negative pulse. When a negative pulse passes through the dial rectifier, relay PR(—) operates through rectifier S6 and connects rectifier S8 to the generator. This circuit may be more effective in shunting out sensitive ringers because it excludes the inductive winding of a relay and resistance R8 may be made as low as necessary and even entirely omitted in view of the provision of resistor R7.

When the series of pulses cease, the line circuit is again momentarily opened by the pin P1 of the dial just before it comes to rest, as has already been explained in the preceding description of the construction of the dial. Relays PR(+) and PR(—) remain on their back contacts, thus the differential windings of relay DR are again closed in parallel and relay DR falls off and releases relay R3R. Relay R3R deenergizes relay R4R but before slow release relay R4R breaks its front contacts a circuit is momentarily closed from battery, outer left back contacts of relay R3R, front contacts of relay R4R, resistor R3 and the upper winding of relay HR to ground. Relay HR is again energized and locks up over the calling line, the circuit of which is now closed with the dial at rest. Another circuit is also momentarily established from ground over the left hand back contacts of relay R3R and front contacts of relay R4R to the counting relays CR. Assume, for example, that the counting relays C1AR, C1CR, CR2 and CR3 are operated, the aforementioned circuit is completed over the front contacts of relays CR2, CR3, back contacts of relay CR4, back contacts of relay TR1, resistor R5 and winding of relay XR3 to battery. When relay R4R breaks its front contacts a short circuit is removed from relay TR1 which locks up in series with relay XR3 over a circuit extending from ground, front contacts of relay RCR, winding of relay TR1, front contacts of relay XR3 and winding of relay XR3 to battery.

It will be noted that dependent upon which relays CR2 . . . CR10 are energized, the relays XR1 . . . XR4 are energized singly and in different combinations and over their contacts apply selective potentials PN1 . . . PN10 to the bank C of the out-control switch PO.

Relay XR3, for example, connects potential PN3 over its front contact and back contacts of relays XR1 and XR2 to terminal No. 1 in the bank C of the out-control switch PO which is the counterpart of the switch PO in the register circuit fully described in my copending application Ser. No. 521,160, filed February 5, 1944. Brush C is connected to the grid of tube V1 of a pair of testing tubes V1, V2. The grid of tube V2 is connected to the *b* wire which extends over the register finder, the R-link, B-link finder and B-link to the first selector (see Fig. 1). If the call is from a main line and relay ER is not energized, on the operation of relay TR1 a circuit is closed over back contacts of relay ER for the lower winding of relay FR which grounds the *a* wire extending to the first group selector over brush B of switch PO in its first position. When the *a* wire is grounded the first group selector hunts for a free trunk connected to potential PN3 and when such a trunk is ground a gas valve (not shown) associated with the tubes V1 and V2 operates and causes the selector to be arrested, all substantially as described in my copending application last referred to.

When relay R4R breaks its front contact the locked up counting relays CR2 . . . CR10 are released and the dialing circuit of the register is restored to normal and awaits the dialing of the next digit, which when dialed causes the register to repeat the operations just described including the locking up of the proper combination of the second group of XR relays. All such subsequent digits must of necessity send in the same initial pulse or pulses so that one of the two first counting relays C1AR or C1BR, as the case may be, may be locked up until the register is released. At the end of the dialing of the first digit, on the relapse of relay R3R but before relay R4R falls off, an obvious circuit is closed for relay OR which locks up to a front contact of relay R1R. Relay OR opens the energizing circuits of relays C1CR and C1DR to prevent operation of these relays when subsequent digits are dialed.

Returning now to the party line identification circuits: The low resistance relay SR is included in the locking circuit of the first counting relays C1AR to C1DR and when energized, upon the energization of relay TR1, places a ground on the starting lead X to the four party line identification circuit (Fig. 8) one of which is required for each 100 party lines or 400 stations. Depending upon which first counting relays C1AR and C1DR are energized, identification potentials PI1 to PI4 are placed on the *t* wire over the upper low resistance winding of relay FR. The identification circuit of Fig. 8 comprises four tube circuits CT1 to CT4 and associated gas valves GV, and the grids of the respective tubes V1 are connected to the four identification potentials PI1 to PI4. When the starting lead X is grounded in the register as described, relay CSR operates, energizes the power magnet P, and the identification finder hunts for the *t* wire upon which the register has placed the PI potential characteristic of the calling station. When that potential has been found the corresponding tube circuit CT1 to CT4 operates. For example, if station A had dialed, identification potential PI1 would be found on the *t* wire and the first tube circuit CT1 would operate. Relay GVR1 is thereby energized and stops the finder and at the same time places a ground on the A brush of the identification finder over front contacts of relay CSR, back contacts of relays GVR4, GVR3, GVR2 and front contacts of GVR1. This ground on the A brush of the identification finder operates relay PSR1 of the party line circuit, Fig. 9, over the left hand winding of that relay which locks up to the *c* wire over its right hand winding in series with the individual service meter SM1. At the same time the first identification finder T terminal of station A is connected to the *t* wire with its identifying potential PS1. The negative identifying potentials PS are placed on the *t* wire through a relatively high resistance, whereas the positive identification potentials PI are placed on the *t* wire through a very low resistance, thereby nullifying the effect of the PS potentials during the moment that the PI potential is connected.

Relay GVR1, Fig. 8, closes an energizing circuit for relay GSR which removes high tension battery from the gas valve GV to deionize it. Relay GSR also grounds the *t* wire thereby energizing relay FR, Fig. 10, over its upper winding. Relay FR locks up over its lower winding and removes ground from the starting lead X to deenergize relay CSR, Fig. 8, and release the identification circuit. Relay FR grounds the *t* wire and also grounds the *a* wire to the first group selector over brush B of the out-control switch PO to permit the starting of the selection responsive to the first digit. The reason for this is that it is desirable that selection should not start until the calling station has been identified. While the identification circuit serves 100 4-party lines or 400 4-party line stations, it is extremely rapid in operation and its holding time averages approximately one second so that the delay due to station identification is negligible.

Relays PSR2, PSR3 or PSR4, Fig. 9, are operated when tube circuits CT2, CT3 or CT4 operate responsive to the application of one of the potentials PI2, PI3 or PI4 to the *t* wire. Relay GVR2, Fig. 8, is arranged to ground the *b* wire, whilst relays GVR3 and GVR4 ground the *c* wire. Relay PSR2, Fig. 9, is connected to the *b* wire whilst relays PSR3 and PSR4 are both connected to the *c* wire. PSR3 is made marginal and operates only when full ground is applied to the C terminal whilst relay PSR4 will operate in series with the resistor R, Fig. 8. This arrangement is employed since four selections are required and only three finder brushes are available over which to exercise such control.

Although the invention has been described in detail as applied to a system of the kind employing multi-potential selection it is not limited in its application thereto and it will be obvious to those versed in the art that the broad principles of the invention as claimed in the appended claims may be employed in telephone exchanges employing any type of selection. Moreover, it is to be understood that the invention is applicable in cases where any or all of the party lines are equipped with two, three or four party line stations.

What is claimed is:

1. In a telephone system, a subscriber's line, first and second party line stations connected thereto, an exchange, selectors at said exchange, a source of current, means for connecting said source of current to said subscriber's line, impulse transmitters at said first and second stations, polarized relay means at said exchange, means for connecting said polarized relay means to said subscriber's line, means comprised in the impulse transmitter at said first party line station for transmitting an impulse of current having one direction of polarity over said subscriber's line as the impulse transmitter thereat is set for transmitting impulses, means comprised in the impulse transmitter at said second party line station for transmitting an impulse of current having the opposite direction of polarity over said subscriber's line as the impulse transmitter thereat is set for transmitting impulses, means operable as said transmitters restore to normal for transmitting numerical pulses over said subscriber's line for controlling said selectors to extend connection to a wanted line, and means controlled by said polarized relay means for determining the identity of the party line station at which a call is initiated.

2. In a telephone system, a subscriber's line, first, second, third and fourth party line stations connected thereto, an exchange, selectors at said exchange, a source of current, means for connecting said source of current to said subscriber's line, impulse transmitters at each of said party line stations, polarized relay means at said exchange, means for connecting said polarized relay means to said subscriber's line, means comprised in the impulse transmitter at said first station for transmitting an impulse of positive polarity over said subscriber's line as the impulse transmitter at said first station is set for transmitting impulses, means comprised in the impulse transmitter at said second station for transmitting an impulse of negative polarity over said subscriber's line as the impulse transmitter at said second station is set for transmitting impulses, means comprised in the impulse transmitter at said third station for transmitting two impulses of positive polarity over said subscriber's line as the impulse transmitter at said third station is set for transmitting impulses, means comprised in the impulse transmitter at said fourth station for transmitting two impulses of negative polarity over said subscriber's line as the impulse transmitter at said fourth station is set for transmitting impulses, means operable as said transmitters restore to normal for transmitting numerical impulses over said subscriber's line for controlling said selectors to extend connection to a wanted line, and means controlled by said polarized relay means and responsive to single arm double operations thereof for determining the identity of the party line station at which a call is initiated.

3. In a telephone system, a subscriber's line, first, second, third and fourth party line stations connected to said line, an exchange, selectors at said exchange, a source of current, means for connecting said source of current to said subscriber's line, signalling devices at each of said stations for transmitting signals over said subscriber's line for controlling said selectors to extend connection to a wanted line, polarized relay mean at said exchange, means for connecting said polarized relay means to said subscriber's line, signal means at said first station for transmitting one impulse of positive polarity over said subscriber's line responsive to the initiation of a call at said first station, signal means at said second station for transmitting one impulse of negative polarity over said subscriber's line responsive to the initiation of a call at said second station, signal means at said third station for transmitting two impulses of positive polarity over said subscriber's line responsive to the initiation of a call at said third station, signal means at said fourth station for transmitting two impulses of negative polarity over said subscriber's line responsive to the initiation of a call at said fourth station, said signaling device adapted to transmit said signals of positive or negative polarity in advance of said selective signals for controlling said selectors, and means controlled by said polarized relay means and responsive to single or double operations thereof for determining the identity of the party line station at which a call is initiated.

4. In a telephone system, a subscriber's line, first and second party line stations connected thereto, an exchange, selectors at said exchange, a source of alternating current, means for connecting said source of alternating current to said subscriber's line, an impulsing device including a uni-directional current conducting element at each party line station, a pair of oppositely polarized relays at said exchange, means for connecting said relays to said subscriber's line at said exchange, means responsive to the operation of the impulsing device at the first station for sending a first impulse of positive polarity followed by a predetermined number of further impulses of alternating polarity over said subscriber's line, means responsive to the operation of the impulsing device at the second station for sending a first impulse of negative polarity followed by a predetermined number of further impulses of alternating polarity over said subscriber's line, means controlled by said polarized relays for determining the identity of the party line station at which the call is initiated, and means controlled by said polarized relays for actuating said selectors.

5. In a telephone system, a subscriber's line, first, second, third and fourth party line stations connected thereto, an exchange, selectors at said exchange, a source of alternating current, means for connecting said source of alternating current to said subscriber's line, an impulsing device including a uni-directional current conducting element at each party line station, a pair of oppositely polarized relays, means for connecting said pair of relays to said subscriber's line, means responsive to the operation of said impulsing device at said first station for sending a first impulse of positive polarity followed by a predetermined number of further impulses of alternating polarity over said subscriber's line, means responsive to the operation of said impulsing device at said second station for sending a first impulse of negative polarity followed by a predetermined number of further impulses of alternating polarity over said subscriber's line, means responsive to the operation of said impulsing device at said third station for sending two impulses of positive polarity followed by a predetermined number of further impulses of alternating polarity over said subscriber's line, means responsive to the operation of said impulsing device at said fourth station for sending two impulses of negative polarity followed by a predetermined number of further impulses of alternating polarity over said subscriber's line, means controlled by said polarized relays and responsive to single or double operations of each relay for determining the identity of the party line station at which the call is initiated, and means controlled by said polarized relays for actuating said selectors.

6. In a telephone system, a subscriber's line, first and second party line stations connected thereto, a register controller including digit storing means, means for completing an impulsing circuit between any one of said party line stations and said register controller including said subscriber's line, an impulsing device including a uni-directional current conducting device at each said station, a source of alternating current, means for connecting said source of alternating current to said impulsing circuit at said register controller, a pair of polarized relays, means for connecting said relays to said impulsing circuit at said register controller, means responsive to the operation of the impulsing device at the first station for sending a first impulse of positive polarity followed by a predetermined number of further impulses of alternating polarity over said subscriber's line, means responsive to the operation of the impulsing device at the second station for sending a first impulse of negative polarity followed by a predetermined number of further impulses of alternating polarity over said subscriber's line, means controlled by said polarized relays for determining the identity of the party line station at which the call is initiated, and means controlled by said polarized relays for actuating said digit storing means.

7. In a telephone system, a subscriber's line, first, second, third and fourth party line stations connected thereto, a register controller including digit storing means, means for completing an impulsing circuit between any one of said party line stations and said register controller including said subscriber's line, an impulsing device including a uni-directional current conducting device at each said station, a source of alternating current, means for connecting said source of alternating current to said impulsing circuit at said register controller, a pair of polarized relays, means for connecting said relays to said impulsing circuit at said register controller, means responsive to the operation of said impulsing device at said first station for sending a first impulse of positive polarity followed by a predetermined number of further impulses of alternating polarity over said subscriber's line, means responsive to the operation of said impulsing device at said second station for sending a first impulse of negative polarity followed by a predetermined number of further impulses of alternating polarity over said subscriber's line, means responsive to the operation of said impulsing device at said third station for sending two impulses of positive polarity followed by a predetermined number of further impulses of alternating polarity over said subscriber's line, means responsive to the operation of said impulsing device at said fourth station for sending two impulses of negative polarity followed by a predetermined number of further impulses of alternating polarity over said subscriber's line, means controlled by said polarized relays and responsive to single or double operation of each relay for determining the identity of the party line station at which the call is initiated, and means controlled by said polarized relays for actuating said digit storing means.

8. In a telephone system, a subscriber's line, a plurality of party line stations connected thereto, an exchange, a subscriber's line circuit at said exchange, a plurality of register controllers at said exchange, means responsive to the initiation of a call at one of said party line stations for extending said subscriber's line to an idle one of said register controllers and for completing a test wire connection from said line circuit to the selected idle register controller, a source of potential, means for connecting a predetermined potential characteristic of party line service to said test wire at said line circuit, and electronic means in said regster controller arranged to respond to said predetermined potential for modifying the circuits of said register controller for party line service.

9. In a telephone system a plurality of subscriber's lines, party line stations connected to each said subscriber's line, an exchange, a plurality of register controllers at said exchange, a line circuit for each subscriber's line including individual service meters for each party line station on the line, a party line identification circuit comprising a switch including a set of movable terminals and a set of stationary terminals one for each said subscriber's line, means responsive to the initiation of a call at any one of said party line stations for connecting the subscriber's line to which it is connected to an idle register controller, means at each party line station for sending to a selected register controller a signal characteristic of the identity of said party line station means in said register controller responsive to said last-mentioned signal for applying to the set of stationary terminals in said identification circuit switch individual to the calling subscriber's line a marking potential characteristic of the calling party line station, means for causing the set of movable terminals of said switch to engage said marked set of stationary terminals, and selective means in said identification circuit arranged to respond to said characteristic marking potential and to prepare a circuit for the service meter individual to the calling party line station in the subscriber's line circuit.

10. An arrangement according to claim 9 where in said selective means in said party line identification circuit comprises an electron tube testing device arranged to respond selectively in accordance with the magnitude of the marking potential applied to the set of stationary terminals in said identification circuit switch.

11. An arrangement according to claim 9, wherein said selective means in said party line identification circuit comprises a plurality of electron tube testing circuits equal in number to the maximum number of party line stations on any subscriber's line each having locally applied to an electrode thereof a potential of a predetermined magnitude and arranged to operate when said marking potential bears a predetermined relation to said potential of predetermined magnitude.

12. An arrangement according to claim 9, further comprising an operator's identification finder switch including a bank terminal for each party line station and wherein means is provided for applying the party line station identification marking potential derived in said register controller to the calling station terminal in said operator's identificaton finder switch.

13. An arrangement according to claim 9 further comprising an operator's identification finder switch including a bank terminal for each party line station and wherein means is provided in said subscriber's line circuit for applying a distinctive class of service potential to the respective bank terminals.

14. An arrangement according to claim 9 wherein the connection set up between said subscriber's line and said idle register controller includes a test wire connection and wherein means is provided in said register controller for applying said marking potential characteristic of the calling party line to said test wire.

15. An arrangement according to claim 9, further comprising an operators' identification finder switch including a bank terminal for each party line station; and means for connecting the said bank terminal of a calling party line station to the calling party line circuit under the control of said selective means in said identification circuit.

16. In a telephone system a plurality of subscriber's lines, party line stations connected to each said subscriber's line, an exchange, a plurality of register controllers at said exchange, a line circuit for each subscriber's line, a party line identification circuit comprising a switch including a set of movable terminals and a set of stationary terminals one for each said subscriber's line, means responsive to the initiation of a call at any one of said party line stations for connecting the subscriber's line to which it is connected to an idle register controller, means at each party line station for sending to a selected register controller a signal characteristic of the identity of said party line station, means in said register controller responsive to said last-mentioned signal for applying to the set of stationary terminals in said identification circuit switch individual to the calling subscriber's line a marking potential characteristic of the calling party line station, means for causing the set of movable terminals of said switch to engage said marked set of stationary terminals, selective means in said identification circuit arranged to respond to said characteristic marking potential, an operator's identification finder switch including a bank terminal for each party line station and means for connecting the said bank terminal of a calling party line station to the calling party line circuit under the control of said last-mentioned selective means.

17. In a telephone system a plurality of subscriber's lines, party line stations each including an impulse transmitter connected to each said subscriber's line, an exchange, a plurality of register controllers in said exchange, a line circuit for each subscriber's line including individual service metering means for each party line station on the line, means responsive to the initiation of a call at a party line station for connecting the subscriber's line to which it is connected to an idle register controller over a pair of impulsing wires and a test wire, means included in said impulse transmitters for sending over said impulsing wires to said selected register controller signals characteristic of their identity, means in said register controller for applying to said test wire a predetermined marking potential characteristic of the identity of a calling station, a party line identification circuit comprising a finder switch having a set of terminals including a test terminal for each said subscriber's line, means for applying the said predetermined characteristic marking potential derived in said register controller to the said test terminal particular to the calling subscriber's line, means for moving said finder switch to engage said marked test terminal, and selective means in said party line identification circuit arranged to respond to said characteristic marking potential and to prepare a circuit for said service metering means individual to the calling party line station.

18. An arrangement according to claim 16 comprising a metering relay in each said subscriber's line circuit for each party line station connected to said line and conductors extending from said metering relays to the individual terminals of a set of terminals in the bank of said identification circuit finder switch, and wherein said selective means in said party line identification circuit is arranged to close circuits over said conductors to selectively actuate said metering relays.

19. In a telephone system, a subscriber's line, a plurality of party line stations connected thereto, an exchange, line circuits including individual service meters for said party line stations, a register controller at said exchange, means for extending said line to said register controller upon the initiation of a call at one of said stations, means at said stations for transmitting signals to said register controller characteristic of the station identity, a party line identification circuit including selective means, means for associating said last-mentioned circuit with a calling line, means for transmitting signals to said identification circuit characteristic of the identity of the calling party line station to operate said selective means, and means for preparing the circuit of a service meter individual to the calling party line station under the control of said selective means.

20. In a telephone system, a subscriber's line, a plurality of party line stations connected thereto, an exchange, a source of alternating current, means for connecting said source of alternating current to said subscriber's line, an impulsing device including a rectifier at each party line station, a ringer at each party line station normally connected to said line, polarized relay means at said exchange, means for connecting said polarized relay means to said subscriber's line, means for intermittently reversing the direction of polarity of the rectifier in said subscriber's line at a calling party line station so as to send alternate trains of positive and negative impulses thereover, and means for providing an effective short circuit to the ringer at other party line stations on said line for said trains of positive and negative impulses and for their complementary half cycles.

GERALD DEAKIN.

REFERENCES CITED

The following references are of record in the file of this patent:

UNITED STATES PATENTS

| Number | Name | Date |
|---|---|---|
| 2,277,206 | Cesare et al. | Mar. 24, 1942 |
| 2,281,508 | Lundstrom | Apr. 28, 1942 |
| 2,306,173 | Logan | Dec. 22, 1942 |
| 2,326,679 | Retallack | Aug. 10, 1943 |
| 2,347,108 | Hubbard | Apr. 18, 1944 |
| 2,406,001 | Deakin | Aug. 20, 1946 |
| 2,410,520 | Ostline | Nov. 5, 1946 |